(12) United States Patent
Oyake et al.

(10) Patent No.: US 8,115,445 B2
(45) Date of Patent: Feb. 14, 2012

(54) OPERATION CONTROL METHOD AND OPERATION CONTROL APPARATUS FOR VARIABLE SPEED GENERATOR-MOTOR

(75) Inventors: Takashi Oyake, Hitachi (JP); Yuuken Okano, Kitaibaraki (JP); Yutaka Kimura, Hitachiomiya (JP)

(73) Assignee: Hitachi, Ltd., Tokyo (JP)

( * ) Notice: Subject to any disclaimer, the term of this patent is extended or adjusted under 35 U.S.C. 154(b) by 311 days.

(21) Appl. No.: 12/574,763

(22) Filed: Oct. 7, 2009

(65) Prior Publication Data

US 2010/0090641 A1  Apr. 15, 2010

(30) Foreign Application Priority Data

Oct. 9, 2008 (JP) ................... 2008-263241

(51) Int. Cl.
*H02P 27/00* (2006.01)
*H02P 6/00* (2006.01)
*H02P 7/00* (2006.01)
(52) U.S. Cl. .............. 318/812; 318/400.01; 318/432; 318/434; 318/700
(58) Field of Classification Search .......... 318/400.01, 318/432, 434, 700, 812
See application file for complete search history.

(56) References Cited

U.S. PATENT DOCUMENTS

| | | | | |
|---|---|---|---|---|
| 4,708,594 A | * | 11/1987 | Shinmei et al. ........... | 417/53 |
| 4,779,034 A | * | 10/1988 | Shepard, Jr. ............. | 318/804 |
| 6,469,469 B1 | * | 10/2002 | Chambers et al. ........... | 318/801 |
| 6,806,688 B2 | * | 10/2004 | Noro et al. ............... | 322/20 |
| 7,425,771 B2 | * | 9/2008 | Rivas et al. .............. | 290/44 |
| 2003/0071596 A1 | * | 4/2003 | Gokhale et al. ........... | 318/727 |
| 2005/0180855 A1 | * | 8/2005 | Horiuchi et al. ........... | 417/31 |
| 2006/0066275 A1 | * | 3/2006 | Thunes et al. ............ | 318/432 |
| 2007/0216164 A1 | * | 9/2007 | Rivas et al. .............. | 290/44 |

FOREIGN PATENT DOCUMENTS

JP  08-080094  3/1996

* cited by examiner

*Primary Examiner* — Paul Ip
*Assistant Examiner* — Gabriel Agared
(74) *Attorney, Agent, or Firm* — Antonelli, Terry, Stout & Kraus, LLP.

(57) ABSTRACT

An excitation device supplies a three-phase AC excitation current to a variable speed generator-motor, and controls the variable speed generator-motor based on a three-phase AC excitation current command value obtained by vector-synthesizing, based on a slip phase from an exciting phase detector, a torque direction excitation current command value from a power adjustment computing device, and a magnetic flux direction excitation current command value from a voltage adjustment computing device by an excitation current adjustment computing device. The variable speed generator-motor includes a power fluctuation suppression circuit that causes the torque direction excitation current command value fixed to a value before switching to follow a torque direction excitation current command target value calculated from an effective power by a predetermined conversion circuit, filter circuit, and limiter circuit during a synchronous operation in an operation control method for operating to switch a variable speed operation method and a synchronous operation method.

6 Claims, 5 Drawing Sheets

CONFIGURATION EXAMPLE OF THE ENTIRE VARIABLE SPEED PUMPING-STORAGE POWER GENERATION SYSTEM

CONFIGURATION EXAMPLE

US 8,115,445 B2

OPERATION CONTROL METHOD AND OPERATION CONTROL APPARATUS FOR VARIABLE SPEED GENERATOR-MOTOR

BACKGROUND OF THE INVENTION

The present invention relates to an operation control method and operation control apparatus of a variable speed generator-motor. More particularly, the present invention relates to an operation control method and operation control apparatus of a variable speed generator-motor for improving stability in a case of performing operation control by a synchronous operation method at the time of starting or stopping pumping of the variable speed generator-motor.

In a variable speed pumping-storage power generation system including a variable speed generation-motor, when a relationship between an electric output of a generator and a motor output of a water wheel becomes unbalanced during the use of a variable speed operation method, a change in the rotation speed of the water wheel occurs and therefore, a change in a slip frequency (rotation speed) transiently occurs. For example, when the generator output is suddenly increased during a power-generating operation, the rotation speed of the water wheel is transiently lowered, whereas when the generator output is suddenly decreased, the rotation speed of the water wheel is transiently raised.

In order that the variable speed generator-motor may continue operating with stability, the variation range of a slip frequency is required to fall in a specified range (variable speed operation range). Therefore, for the purpose of preventing the slip frequency from deviating from the variable speed operation range, there is used a synchronous operation method for operating in a state where the slip frequency is held constant. This synchronous operation method is realized by fixing the slip frequency and a torque direction excitation current command value. However, when the variable speed generator-motor is started or stopped using the synchronous operation method, the excitation amount fails to be controlled to the optimum value to fix the torque direction excitation current command value, and therefore, an unstable phenomenon occurs due to over excitation or under excitation. As a result, when the synchronous operation method is used at the time of starting or stopping the pumping of the generator-motor, there is a problem that fluctuations of an effective power occur in a process where the effective power increases or decreases.

For the purpose of suppressing the above-described fluctuations of the effective power, a torque direction excitation current component of the variable speed generator-motor is adjusted and operated so as to reach a predetermined value.

In JP-A-08-80094, disclosed is an example of an operation control method using a method for calculating the optimum torque direction excitation current command target value of the excitation current from an effective power PL by a predetermined conversion formula (PL×C+D) (C and D are constant numbers) at the time of starting the pumping of the variable speed generator-motor and for adjusting a torque direction excitation current command value fixed immediately before switching to the synchronous operation method so as to approximate a target value calculated using the conversion formula, as well as using a method for raising or lowering the fixed torque direction excitation current command value up to a predetermined value previously set.

SUMMARY OF THE INVENTION

In the conventional operation control method, for the purpose of securing the optimum excitation current at the time of starting the pumping in the synchronous operation method, a value calculated from the effective power PL by a predetermined conversion formula is used as a torque direction excitation current command target value. In this case, since a term of the fluctuated effective power PL is contained in the conversion formula, the torque direction excitation current command target value may be fluctuated due to fluctuations of the effective power. Therefore, there is a problem that stability of the excitation amount and the power is hard to be secured.

When the torque direction excitation current command value is raised or lowered up to the predetermined fixed command target value, the torque direction excitation current command value is operated regardless of the effective power PL. Therefore, there is a problem that an excess or deficiency of the torque direction excitation current component occurs.

Further, in the predetermined conversion formula (PL×C+D), a term (D term) of a bias portion is provided for the purpose of securing the minimum torque direction excitation current amount. However, when the effective power largely fluctuates (e.g., when a polarity suddenly changes), the PL×C term becomes negative, and therefore, the torque direction excitation current command target value may be reduced more than the term (D term) of the bias portion. As a result, it is also considered that the minimum torque direction excitation current amount fails to be secured.

In view of the foregoing, it is an object of the present invention to provide an operation control method and operation control apparatus of the variable speed generator-motor capable of controlling the excitation amount to the optimum value for the purpose of securing the stable excitation amount and the stability of power also under conditions that the effective power fluctuates.

To accomplish the above objects, according to one aspect of the present invention, provided is an operation control method for a variable speed generator-motor including a power fluctuation suppression circuit that causes a torque direction excitation current command value fixed to a value immediately before switching to follow a torque direction excitation current command target value calculated by a predetermined conversion circuit, filter circuit, and limiter circuit from an effective power during operation control using a synchronous operation method. The operation control method includes:

exciting a secondary winding of a variable speed generator-motor whose primary winding is connected to a power system by a three-phase AC excitation current obtained by vector-synthesizing, based on a slip phase equivalent to a difference between a voltage phase of the power system and a rotation phase of the variable speed generator-motor, a torque direction excitation current command value obtained by effective power adjustment computing to make zero deviations of a command value of an input/output effective power and detection value of an effective power of the variable speed generator-motor, and a magnetic flux direction excitation current command value obtained by voltage adjustment computing to make zero deviations of a command value of an output voltage and detection value of an output voltage of the variable speed generator-motor; and operating to switch, by a synchronous operation Iq switching control circuit under arbitrary conditions, a variable speed operation method for controlling an excitation current by two components of a torque direction excitation current component and a magnetic flux direction excitation current component, and a synchronous operation method for switching the torque direction excitation current command value to a value immediately before switching an operation method and at the same time for switching a slip phase to a sine wave fixed to a slip frequency immediately before switching an operation method and for performing the control by an excitation current with a constant frequency.

To accomplish the above objects, according to another aspect of the present invention, in the power fluctuation suppression circuit using the synchronous operation method, a dead band is provided; and when a difference between the calculated torque direction excitation current command target value and the torque direction excitation current command value is kept within a previously set value, control of the torque direction excitation current command value is not performed.

According to the present invention, when the variable speed generator-motor is started or stopped using the synchronous operation method, a fixed torque direction excitation current component of the excitation current can be stably controlled up to the optimum value. Particularly, when the filter circuit is provided, fluctuations by directly receiving an influence due to fluctuations of the effective power can be suppressed. Further, when the limiter circuit is provided, an unstable phenomenon due to over excitation or under excitation is eliminated. Only when the dead band is provided and a difference between the torque direction excitation current command target value and the torque direction excitation current command value is a constant value or more, the torque direction excitation current command value is controlled. By doing so, the power fluctuation suppression circuit can cause the torque direction excitation current command value to follow the torque direction excitation current command target value in a ramp shape in a stable state. These enable the power fluctuation suppression circuit to reduce the power fluctuations.

Other objects, features and advantages of the invention will become apparent from the following description of the embodiments of the invention taken in conjunction with the accompanying drawings.

DESCRIPTION OF THE EMBODIMENTS

Figure 1:
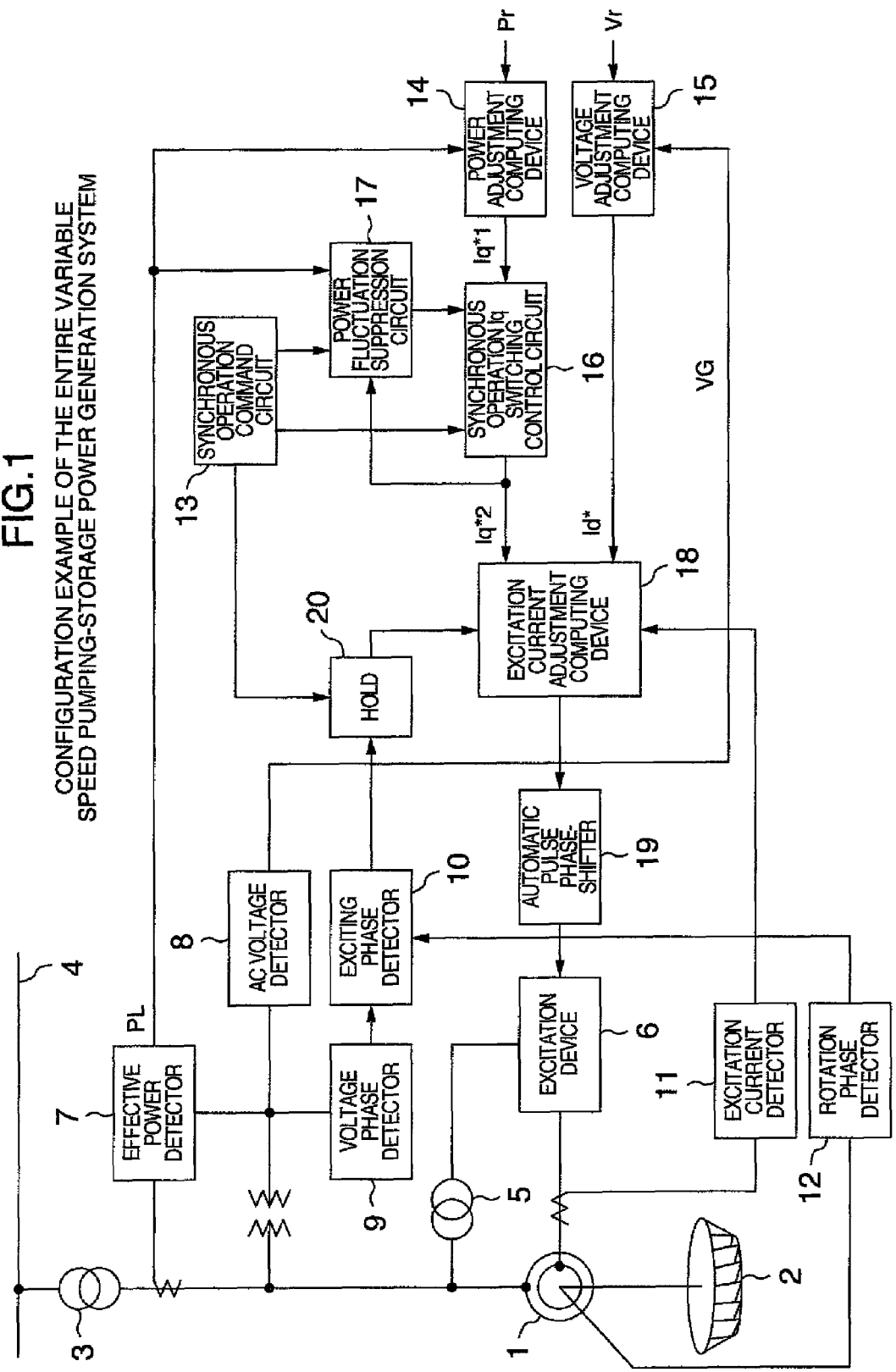
FIG. 1 is a block diagram illustrating a configuration example of the entire variable speed pumping-storage power generation system according to one embodiment of the present invention.
Figure 2:
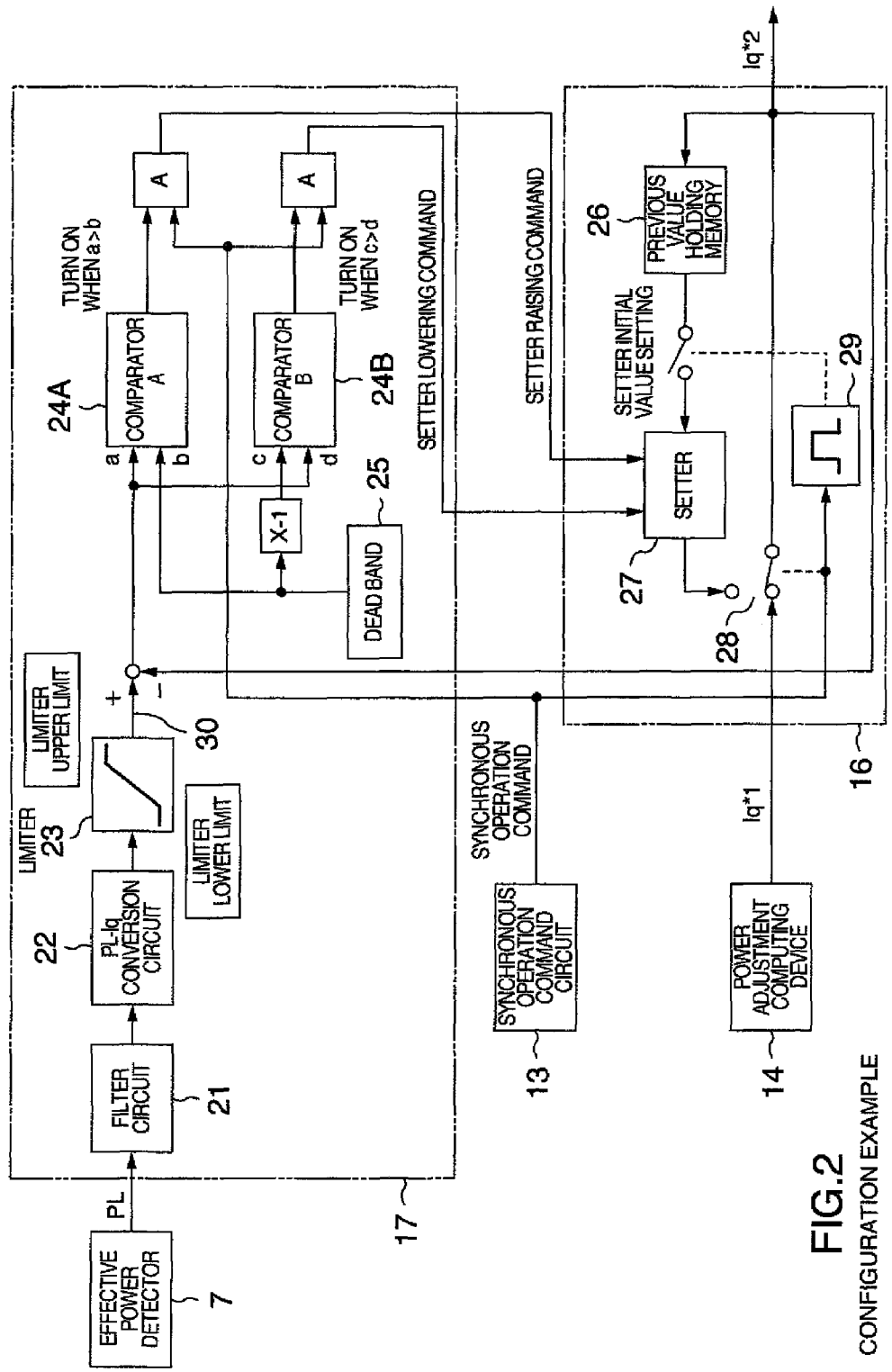
FIG. 2 is a block diagram illustrating a configuration example of a power fluctuation suppression circuit and synchronous operation Iq switching control circuit according to one embodiment of the present invention.

Hereinafter, preferred embodiments of the present invention will be described in detail with reference to the accompanying drawings of the embodiments. FIG. 1 illustrates a configuration example of the entire system according to one embodiment of a variable speed pumping-storage power generation system to which the present invention is applied, and FIG. 2 illustrates a configuration example of a power fluctuation suppression circuit and a synchronous operation Iq switching control circuit.

At first, referring to FIG. 1, a configuration example of the entire variable speed pumping-storage power generation system to which the present invention is applied will be described. Referring to FIG. 1, a stator winding of a variable speed generator-motor 1 is connected to a power system 4 via a main transformer 3. Further, to the variable speed generator-motor 1, a water wheel 2 is connected. To a primary side of the main transformer 3, an excitation device 6 is connected via an excitation transformer 5, and connected to a secondary winding of the variable speed generator-motor 1 to supply a three-phase AC excitation current.

To the variable speed generator-motor 1, a rotation phase detector 12 is connected, and detects a generator rotation phase. To the stator winding side of the variable speed generator-motor 1, a voltage phase detector 9 is connected, and detects a system side voltage phase. An exciting phase detector 10 receives the system side voltage phase detected by the voltage phase detector 9 and the generator rotation phase detected by the rotation phase detector 12, and calculates a slip phase based on the system side voltage phase and the generator rotation phase to output the slip phase.

When supplying a three-phase AC excitation current to the secondary winding of the variable speed generator-motor 1, the excitation device 6 controls the variable speed generator-motor 1. The three-phase AC excitation current output by the excitation device 6 is controlled by an excitation current adjustment computing device 18. Specifically, the excitation current adjustment computing device 18 supplies the three-phase AC excitation current command value to an automatic pulse phase-shifter 19, and the excitation device 6 is controlled by the control output generated based on the three-phase AC excitation current command value supplied to the automatic pulse phase-shifter 19. The excitation current output from the excitation device 6 is detected by an excitation current detector 11, and fed back to the excitation current adjustment computing device 18.

The excitation current adjustment computing device 18 receives a slip phase output by the exciting phase detector 10, a torque direction excitation current command value Iq*1 (Iq*2) output by a power adjustment computing device 14, and a magnetic flux direction excitation current command value Id* output by a voltage adjustment computing device 15, and vector-synthesizes them to output the three-phase AC excitation current command value.

The power adjustment computing device 14 receives an effective power command value Pr and an effective power PL detected by an effective power detector 7 connected to the stator winding side of the variable speed generator-motor 1, and calculates the torque direction excitation current command value Iq*1 so as to make zero deviations of the effective power command value Pr and the effective power PL to output the torque direction excitation current command value Iq*1. Further, the voltage adjustment computing device 15 receives a generator-motor voltage command value Vr and a generator-motor voltage VG detected by an AC voltage detector 8 connected to the stator winding side of the variable speed generator-motor 1, and calculates the magnetic flux direction excitation current command value Id* so as to make zero deviations of the generator-motor voltage command value Vr and the generator-motor voltage VG to output the magnetic flux direction excitation current command value Id*.

The automatic pulse phase-shifter 19 receives the three-phase AC excitation current command value output from the excitation current adjustment computing device 18, generates the control output for obtaining the excitation current comparable to the three-phase AC excitation current command value, and outputs the control output to the excitation device 6 to thereby control the excitation device 6.

A synchronous operation command circuit 13 gives a synchronous operation command to each circuit in an operation state of performing a synchronous operation method. When performing the operation using the synchronous operation method, the slip phase and the torque direction excitation current command value Iq* are fixed to a state immediately before a synchronous operation switching.

A synchronous operation Iq switching control circuit 16 receives a command from the synchronous operation command circuit 13, and performs switching control between a variable speed operation method and the synchronous operation method. Specifically, the synchronous operation Iq switching control circuit 16 receives the torque direction excitation current command value Iq*1 from the power adjustment computing device 14, and adjusts the torque direction excitation current command value Iq*1 in accordance with an operation state to output it as the torque direction excitation current command value Iq*2. The synchronous operation Iq switching control circuit 16 passes the input signal Iq*1 when using the variable speed operation method. Accordingly, the synchronous operation Iq switching control circuit 16 directly outputs the torque direction excitation current command value Iq*1 produced from the power adjustment computing device 14 as the torque direction excitation current command value Iq*2. Meanwhile, when using the synchronous operation method, by the command from the synchronous operation command circuit 13, the synchronous operation Iq switching control circuit 16 first sets as an initial value the torque direction excitation current command value Iq*2 immediately before the synchronous operation command in a setter 27 installed in the synchronous operation Iq switching control circuit 16. The synchronous operation Iq switching control circuit 16 switches an Iq command value switching switch 28 to the setter 27 side, and outputs as the Iq*2 the torque direction excitation current command value adjusted by the setter 27. As a result, the torque direction excitation current command value Iq*2 during the synchronous operation fails to be influenced by the torque direction excitation current command value Iq*1 output from the power adjustment computing device 14, and is fixed to the Iq command value immediately before the synchronous operation command. In addition, details of the synchronous operation Iq switching control circuit 16 will be illustrated in FIG. 2, and described below.

A power fluctuation suppression circuit 17 receives the effective power PL detected by the effective power detector 7 and the torque direction excitation current command value Iq*2 output from the synchronous operation Iq switching control circuit 16, and outputs an operation command to the setter 27 in the synchronous operation Iq switching control circuit 16 when using the synchronous operation method. The power fluctuation suppression circuit 17 first calculates the optimum torque direction excitation current command target value based on the received effective power PL. Further, the power fluctuation suppression circuit 17 outputs an operation command such as a raising command or a lowering command to the setter 27 in the synchronous operation Iq switching control circuit 16 so as to follow the torque direction excitation current command target value calculated by torque direction excitation current command value Iq*2. By doing so, the power fluctuation suppression circuit 17 suppresses a fluctuation of the torque direction excitation current command value Iq*2 due to a sudden change of the effective power in the synchronous operation method, and makes controls so that the torque direction excitation current command value Iq*2 may be stably equal to the optimum value. In addition, details of the power fluctuation suppression circuit 17 will be illustrated in FIG. 2, and described below.

Next, the control of the excitation current that controls the variable speed generator-motor 1 will be described.

The excitation current command to the excitation current adjustment computing device 18 is divided into two axis components of the excitation current component Id* in the "d" axis direction, which generates an induced voltage of the variable speed generator-motor 1 and the excitation current component Iq* in the "q" axis direction, which is orthogonalized to the excitation current component Id* and changes the effective power. The above-described axial directions are determined by the system side voltage phase detected by the voltage phase detector 9 and the generator rotation phase detected by the rotation phase detector 12. Therefore, in the excitation current adjustment computing device 18, the torque direction excitation current command Iq* and the magnetic flux direction excitation current command Id* are vector-synthesized to calculate the three-phase AC excitation current command value based on the slip phase calculated by the exciting phase detector 10 from the system side voltage phase and the generator rotation phase. As a result, the variable speed generator-motor 1 is controlled independently by the "d" axis component (magnetic flux component) and "q" axis component (torque component) of the excitation current.

When controlling the effective power in the variable speed generator-motor 1, the torque direction excitation current command value Iq* in the "q" axis component (torque component) is changed. In the example, the torque direction excitation current command value Iq* is the torque direction excitation current command value Iq*2 output from the synchronous operation Iq switching control circuit 16. When using the variable speed operation method, the torque direction excitation current command value Iq*1 output from the power adjustment computing device 14 is directly output as the torque direction excitation current command value Iq*2. Therefore, to the excitation current adjustment computing device 18, the torque direction excitation current command value Iq*1 output from the power adjustment computing device 14 is supplied as the torque direction excitation current command value Iq*. Meanwhile, when using the synchronous operation method, the synchronous operation Iq switching control circuit 16 outputs as the torque direction excitation current command value Iq*2 the output from the setter 27 installed in the synchronous operation Iq switching control circuit 16. In addition, in the example, the power fluctuation suppression circuit 17 operates and acts on the setter 27 to adjust the torque direction excitation current command value Iq*2 during the synchronous operation.

When performing the voltage control of the variable speed generator-motor 1, the magnetic flux direction excitation current command value Id* in the "d" axis component (magnetic flux component) is changed. The magnetic flux direction excitation current command value Id* is output from the voltage adjustment computing device 15, and calculated so as to make zero the deviations of the generator-motor voltage command value Vr and the generator-motor voltage VG detected by the AC voltage detector 8.

Next, the configuration example of the synchronous operation Iq switching control circuit 16 and the power fluctuation suppression circuit 17 will be described with reference to FIG. 2.

Referring to FIG. 2, the synchronous operation Iq switching control circuit 16 receives the torque direction excitation current command value Iq*1 output from the power adjustment computing device 14 and the synchronous operation command output from the synchronous operation command circuit 13, and outputs the torque direction excitation current command value Iq*2 to the excitation current adjustment computing device 18. The power fluctuation suppression circuit 17 receives the effective power PL detected by the effective power detector 7, the torque direction excitation current command value Iq*2 output from the synchronous operation Iq switching control circuit 16, and the synchronous operation command output from the synchronous operation command circuit 13, and outputs the operation command to the setter 27 in the synchronous operation Iq switching control circuit 16.

The synchronous operation Iq switching control circuit 16 includes a previous value holding memory 26, the setter 27, the Iq command value switching switch 28, and a one-shot timer 29.

When the synchronous operation command from the synchronous operation command circuit 13 is turned on, the one-shot timer 29 is turned on for a certain period of time. As a result, the torque direction excitation current command value Iq*2 immediately before the synchronous operation command is set in the setter 27 as an initial value. Every when outputting the torque direction excitation current command value Iq*2 to the excitation current adjustment computing device 18, the torque direction excitation current command value Iq*2 is kept in the previous value holding memory 26. When the one-shot timer 29 is turned on, a value of the previous value holding memory 26 is set in the setter 27. At the same time, the Iq command value switching switch 28 is switched to the setter 27 side. Therefore, the torque direction excitation current command value Iq*2 from the synchronous operation Iq switching control circuit 16 is output from the setter 27. Meanwhile, when the synchronous operation command from the synchronous operation command circuit 13 is turned off, the Iq command value switching switch 28 is switched to the power adjustment computing device 14 side. Therefore, the torque direction excitation current command value Iq*1 produced from the power adjustment computing device 14 is directly output as the torque direction excitation current command value Iq*2.

The power fluctuation suppression circuit 17 includes a filter circuit 21 using a primary delay, a PL-Iq conversion circuit 22 that converts the effective power PL to the Iq command value using a predetermined conversion formula (PL×A), a limiter 23 that prevents a sudden change in the Iq command value calculated by the predetermined conversion formula. When supplying the effective power PL to the filter circuit 21, the PL-Iq conversion circuit 22, and the limiter 23, the power fluctuation suppression circuit 17 calculates the torque direction excitation current command target value 30 to output it. Further, the power fluctuation suppression circuit 17 includes a dead band 25, a comparator A 24A, and comparator B 24B which output the operation command to the setter 27 in the synchronous operation Iq switching control circuit 16 based on the torque direction excitation current command target value 30 and the torque direction excitation current command value Iq*2.

The power fluctuation suppression circuit 17 according to one embodiment of the present invention first supplies the effective power PL to the PL-Iq conversion circuit 22 via the filter circuit 21 using the primary delay. Conventionally, since directly supplying the effective power PL to the predetermined conversion formula to output the torque direction excitation current command value, the torque direction excitation current command value is excessively operated along with the fluctuation of the effective power PL. Therefore, there is the possibility that power fluctuations are caused due to the excessive operations. To cope with the above-described problem, in the example, the effective power PL is supplied to the PL-Iq conversion circuit 22 via the filter circuit 21 using the primary delay, whereby the influence due to the fluctuations of the effective power PL is intended to be relaxed.

Next, the limiter 23 receives the Iq command value calculated by the PL-Iq conversion circuit 22, and converts the Iq command value to a value limited by the upper and lower limits that are set as the limiter to output the torque direction excitation current command target value 30. Herein, the upper limit of the limiter is set to prevent an over excitation state due to a sudden change of the torque direction excitation current command target value along with a sudden change of the effective power PL, and the upper limit that prevents the over excitation state is set.

Meanwhile, as the lower limit of the limiter, the torque direction excitation current command target value required at the time of establishing the priming water pressure is set. As a result, the torque direction excitation current command value is raised up to the lower limit of the limiter immediately after switching to the synchronous operation method. Therefore, the excitation amount during the time from the water contact of the water wheel up to the establishment of the priming water pressure can be secured by performing the release of the water level depression after waiting for the above-described state. Conventionally, the minimum required torque direction excitation current command target value is set in the PL-Iq conversion formula as a bias term of the predetermined conversion formula. For the purpose, at the initial stage of an operation start of the variable speed generator-motor, when a value of the effective power PL is small, and particularly, when the effective power PL fluctuates and the polarity is reverse (negative), the required excitation amount may not be secured. On the other hand, in the example, the minimum required torque direction excitation current command target value is not set as the bias term of the conversion formula, and the bias portion is set as the lower limit of the limiter. As a result, also when the effective power PL suddenly changes by the influence of some sort, the minimum torque direction excitation current command target value can be surely compensated.

Next, a differential "a" between the torque direction excitation current command target value 30 output from the limiter 23 and the torque direction excitation current command value Iq*2 produced from the synchronous operation Iq switching control circuit 16 is calculated, and the obtained differential is supplied to the comparator A 24A. A value that is set as a dead band "b" from the dead band 25 is further supplied to the comparator A 24A. The comparator A 24A compares both values of the differential "a" and the dead band "b". When the differential "a" is larger than the dead band "b" (a>b), an ON signal is generated. On the other hand, to the comparator B 24B, supplied is a differential "d" between the torque direction excitation current command target value 30 and the torque direction excitation current command value Iq*2 produced from the synchronous operation Iq switching control circuit 16 as well as a value "c" resulting from changing a sign of the value set as the dead band. The comparator B 24B compares both values of the differential "d" and the dead band "c". When the differential "d" is smaller than the dead band "c" (c>d), an ON signal is generated.

The comparator A 24A makes a judgment in the case where the torque direction excitation current command target value 30 is larger than the torque direction excitation current command value Iq*2 and the torque direction excitation current command value Iq*2 is controlled in an upward direction. Meanwhile, the comparator B 24B makes a judgment in the case where the torque direction excitation current command target value 30 is smaller than the torque direction excitation current command value Iq*2 and the torque direction excitation current command value Iq*2 is controlled in a downward direction. The dead band 25 is a storage unit that keeps a value set as the dead band. In the example, the raising or lowering command is issued such that the torque direction excitation current command value Iq*2 follows the torque direction excitation current command target value 30; however, a value of the dead band is set such that the raising or lowering command is not issued in the case when the command value surpasses the target value due to its operation.

Next, the power fluctuation suppression circuit 17 executes AND operation between an output from the comparator A 24A or the comparator B 24B and the synchronous operation command from the synchronous operation command circuit 13. Based on the above-described results, the power fluctuation suppression circuit 17 controls the setter 27 of the synchronous operation Iq switching control circuit 16. The power fluctuation suppression circuit 17 outputs the raising command to the setter 27 when both of the comparator A 24A and the synchronous operation command are ON, and outputs the lowering command to the setter 27 when both of the comparator B 24B and the synchronous operation command are ON.

When the above-described dead band is provided, the power fluctuation suppression circuit 17 fails to exercise control over the setter 27 and fixes the torque direction excitation current command value Iq*2 in the case where a difference between the torque direction excitation current command target value 30 and the torque direction excitation current command value Iq*2 is kept in the range of the dead band. In the conventional control, until the torque direction excitation current command target value 30 and the torque direction excitation current command value Iq*2 coincide with each other, the power fluctuation suppression circuit 17 changes the torque direction excitation current command value Iq*2, and therefore, performs excessive operations; accordingly, hunting is generated and the circuit becomes unstable. According to the example, the power fluctuation suppression circuit 17 can stably control the torque direction excitation current command value Iq*2 to suppress the power fluctuation.

Further, the raising or lowering command output from the power fluctuation suppression circuit 17 acts, when supplied to the setter 27 of the synchronous operation Iq switching control circuit 16, on the torque direction excitation current command value Iq*2 set in the setter 27, and raises or lowers the command value at a regular change rate. Herein, the change rate of the setter 27 is set such that the torque direction excitation current command value Iq*2 fails to surpass the torque direction excitation current command target value 30 even if performing the raising or lowering operation once.

Figure 3:
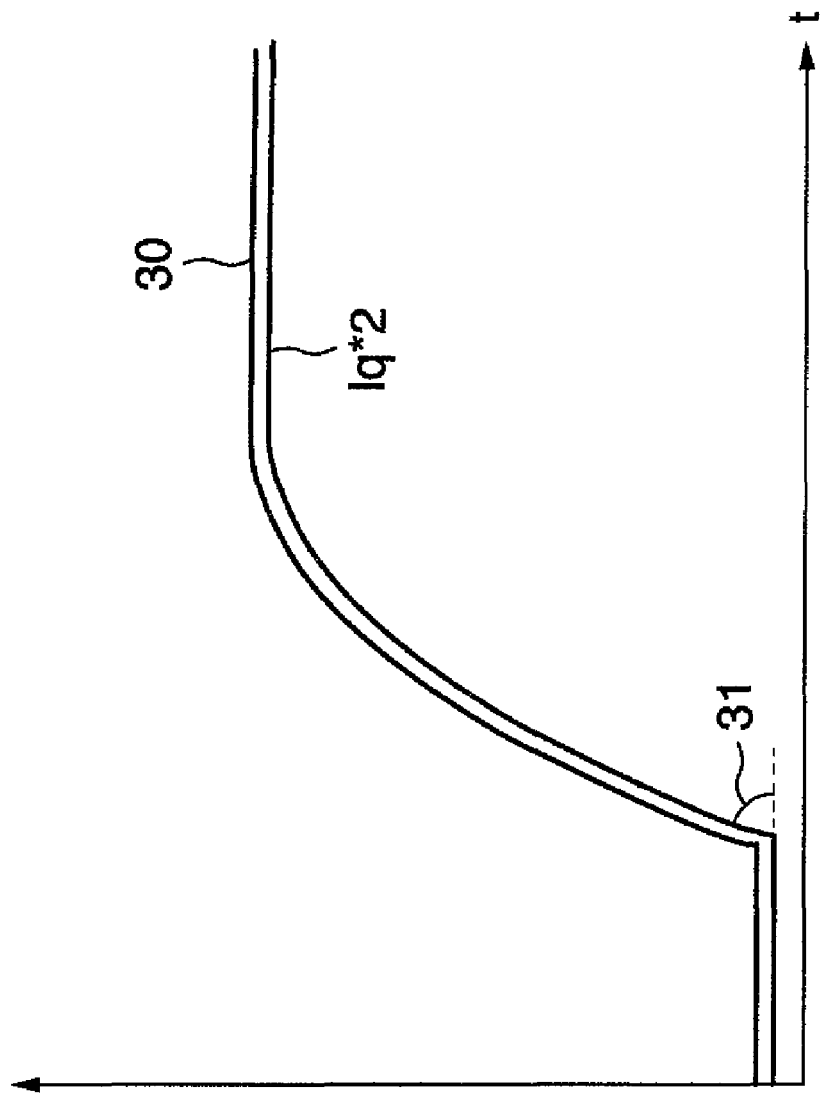
FIG. 3 is an explanatory diagram illustrating an example of a graph of a torque direction excitation current command value and target value according to one embodiment of the present invention.

FIG. 3 is an example of a graph illustrating a state of the torque direction excitation current command target value 30 and the torque direction excitation current command value Iq*2. As illustrated in FIG. 3, the torque direction excitation current command value Iq*2 is raised or lowered as the torque direction excitation current command target value 30 changes to a value comparable to the effective power PL. In the example, when performing the raising operation, for example, the change rate (rising angle) 31 at the time of increasing the torque direction excitation current command value Iq*2 is relaxed. This enables the torque direction excitation current command value Iq*2 to follow the torque direction excitation current command target value 30 nearly in a ramp shape (constant angle) to suppress the power fluctuation. Much the same is true on the case of performing the lowering operation.

Figure 4:
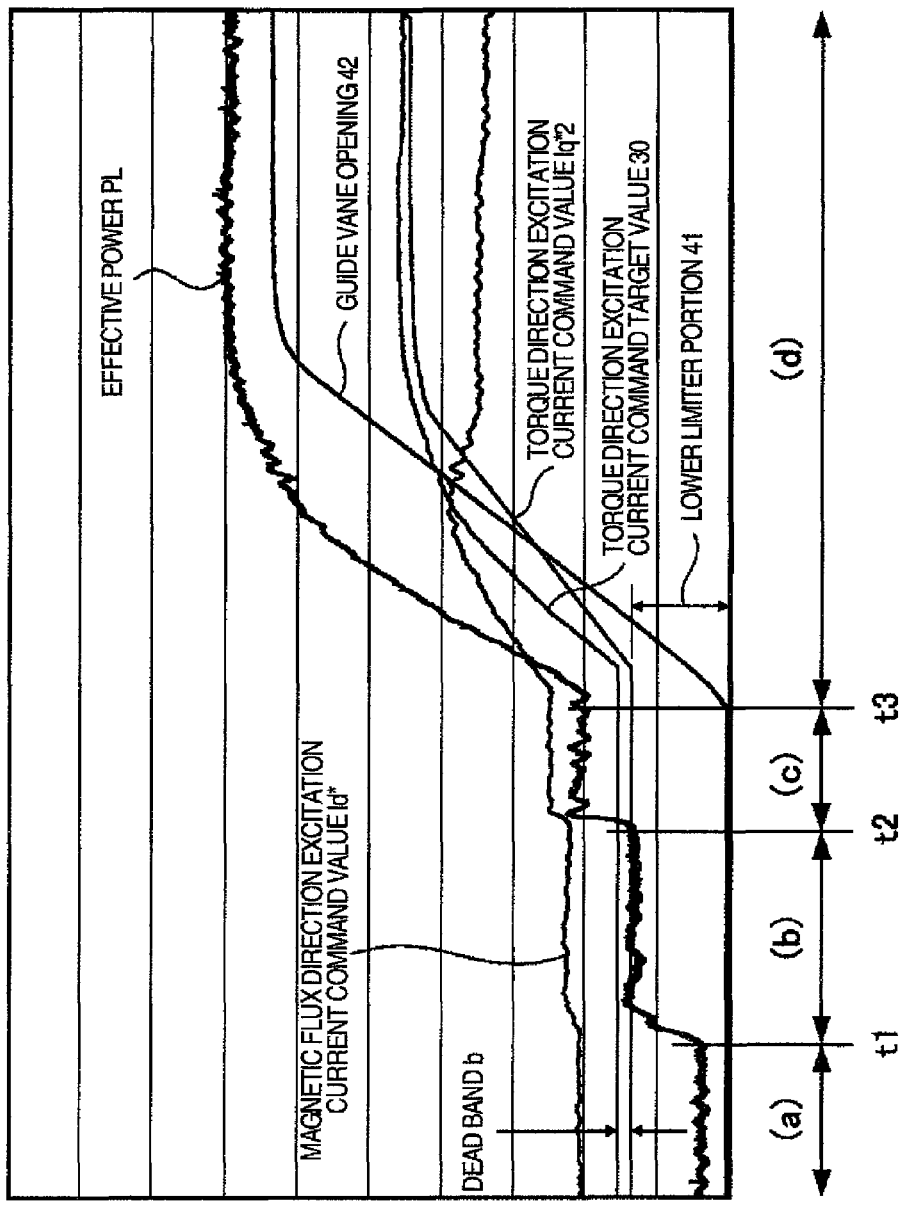
FIG. 4 is an explanatory diagram illustrating an operation example at the time of starting the pumping according to one embodiment of the present invention.

Next, the operation examples at the time of starting the pumping according to one embodiment of the present invention will be described. FIG. 4 illustrates the operation example at the time of starting the pumping according to one embodiment of the present invention, and FIG. 5 illustrates the operation example at the time of starting the pumping according to the conventional control.

Figure 5:
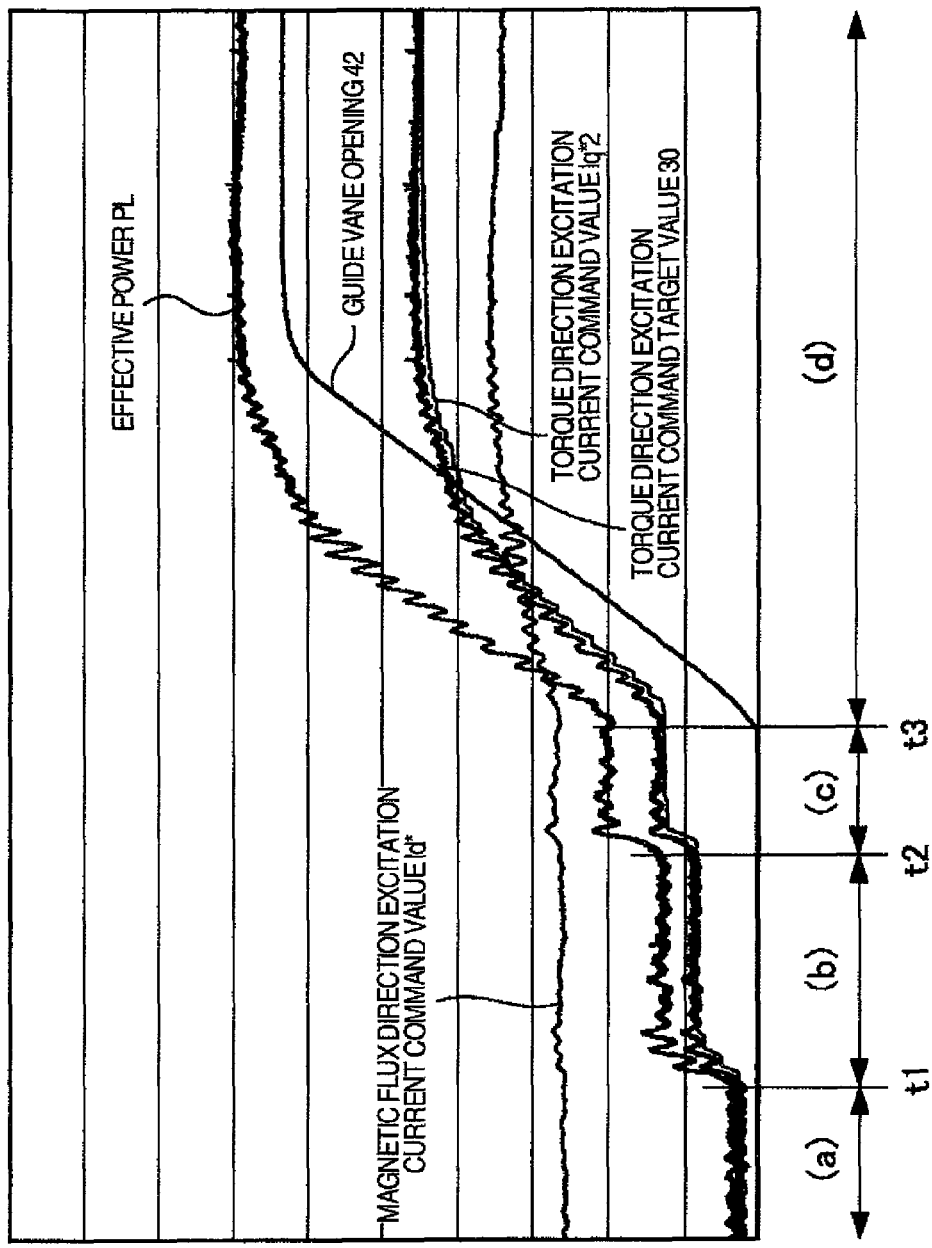
FIG. 5 is an explanatory diagram illustrating an operation example at the time of starting the pumping according to a conventional control.

FIGS. 4 and 5 are graphs illustrating the effective power PL, the torque direction excitation current command target value 30, the torque direction excitation current command value Iq*2, the magnetic flux direction excitation current command value Id*, and a guide-vane opening 42. Further, FIGS. 4 and 5 illustrate a process at the time of starting the pumping. FIGS. 4 and 5 illustrate release t1 of the water level depression, establishment t2 of the priming water pressure, and start-up t3 of the pumping as the timing in which a state largely changes at the time of starting the pumping. As for the process at the time of starting the pumping, an idle running state of the water wheel due to the water level depression (a) is illustrated until the release t1 of the water level depression, the water level rises due to the release t1 of the water level depression, the water wheel 2 is contacted with the water level, and the water level starts to be pushed up by the rotation of the water wheel (b). When the water pressure reaches a pressure capable of starting the pumping, the priming water pressure is established t2 (c). When the guide vane starts to be opened via the establishment t2 of the priming water pressure, the pumping is started t3. On and after the start-up t3 of the pumping, the guide vane is opened up to a suitable opening, and the pumping is performed (d).

In the above-described process at the time of starting the pumping, the control is performed using the synchronous operation method. Since the torque required by the water wheel largely changes, the effective power PL most largely changes in the process of the pumping operation as illustrated in FIGS. 4 and 5. Particularly, when the water wheel is contacted with the water level, and when the priming water pressure is established, the torque direction excitation current command value Iq*2 is hard to follow a value comparable to the effective power PL without delay due to sudden change of the effective power PL.

For the purpose, in the example, the torque direction excitation current command target value required at the time of establishing the priming water pressure is set as the lower limit of the limiter 23 of the power fluctuation suppression circuit 17. Referring to FIG. 4, a value set as the lower limit of the limiter 23 is indicated as a lower limiter portion 41. By doing so, immediately after switching to the synchronous operation method, the torque direction excitation current command value Iq*2 is raised up to the lower limiter portion 41. Therefore, when the release t1 of the water level depression is performed in the above-described state, the excitation amount during the time from the water contact of the water wheel up to the start-up t3 of the pumping can be secured.

The torque direction excitation current command value Iq*2 on and after the start-up t3 of the pumping operation is operated up to the optimum value so as to follow the effective power PL. In this connection, since the effective power PL is proportional to the torque required by the water wheel 2, a certain level of fluctuations occur steadily. Therefore, when this effective power PL is directly substituted in the predetermined conversion formula, the torque direction excitation current command value Iq*2 is excessively operated as illustrated in FIG. 5. As a result, the torque direction excitation current command value Iq*2 receives the excessive operations to further increase the fluctuations of the effective power PL.

Therefore, in the example, the filter circuit 21 using the primary delay is provided on the power fluctuation suppression circuit 17, and the effective power PL is supplied via the filter circuit 21 to the PL-Iq conversion circuit 22. By doing so, the torque direction excitation current command target value 30 is prevented from directly receiving the influence due to the fluctuations of the effective power PL, and can follow the effective power PL at a constant slope nearly in a ramp shape as illustrated in FIG. 4. As a result, the power fluctuation suppression circuit 17 can cause the torque direction excitation current command value Iq*2 to follow the torque direction excitation current command target value 30 nearly in a ramp shape in a stable state. These enable the fluctuations of the effective power PL to be reduced and the power fluctuations to be suppressed.

Further, the torque direction excitation current command target value 30 changes to a value comparable to the effective power PL. Accordingly, depending on the manner of the change in the effective power PL, not only the raising operation but also the lowering operation may be performed on the torque direction excitation current command value Iq*2. Conventionally, the operation direction of the torque direction excitation current command value Iq*2 is determined by the deviation polarity of the torque direction excitation current command target value 30 and torque direction excitation current command value Iq*2 which are calculated from the predetermined conversion formula. For the purpose, when the torque direction excitation current command value Iq*2 fails to perfectly coincide with the torque direction excitation current command target value 30, the raising and lowering operations are repeatedly performed. As illustrated in FIG. 5, since the torque direction excitation current command target value 30 also changes in response to the fluctuations of the effective power PL, there is the possibility that the power fluctuations are caused based on its fluctuations.

To cope with the above-described problem, in the example, the dead band 25 is provided on the detector for the raising and lowering operations. When the deviation falls in the dead band, the operation of the torque direction excitation current command value Iq*2 is locked, thereby suppressing the power fluctuations. FIG. 4 illustrates a dead band width that is set in the dead band 25 as the dead band "b". When the deviations of the torque direction excitation current command target value 30 and the torque direction excitation current command value Iq*2 falls in the dead band width "b", the operation of the torque direction excitation current command value Iq*2 is locked to fix the value. Meanwhile, when the deviation surpasses the dead band width "b", the operation of the torque direction excitation current command value Iq*2 is performed. As a result, even when the torque direction excitation current command value Iq*2 fails to perfectly coincide with the torque direction excitation current command target value 30, the torque direction excitation current command value Iq*2 is fixed to perform the stable operation at the time where its deviation is kept within a constant width.

In addition, the power fluctuation suppression at the time of starting the pumping of the variable speed generator-motor is herein described, and further, the same effect may be exerted also at the time of stopping the pumping of the variable speed generator-motor.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An operation control method for a variable speed generator-motor including a power fluctuation suppression circuit that causes a torque direction excitation current command value to be fixed to a value immediately before switching to follow a torque direction excitation current command target value calculated by a predetermined conversion circuit, filter circuit, and limiter circuit from an effective power during operation control using a synchronous operation method, the method comprising:

exciting a secondary winding of a variable speed generator-motor whose primary winding is connected to a power system by a three-phase AC excitation current obtained by vector-synthesizing, based on a torque direction excitation current command value obtained by effective power adjustment computing to make zero deviations between a command value of an input/output effective power and detection value of an effective power of the variable speed generator-motor, a slip phase equivalent to a difference between a voltage phase of the power system and a rotation phase of the variable speed generator-motor, and a magnetic flux direction excitation current command value obtained by voltage adjustment computing to make zero deviations of a command value of an output voltage and detection value of an output voltage of the variable speed generator-motor; and operating to switch, by a synchronous operation Iq switching control circuit under arbitrary conditions, a variable speed operation method for controlling an excitation current by utilizing two components of a torque direction excitation current component and a magnetic flux direction excitation current component, and a synchronous operation method for changing over the torque direction excitation current command value to a value immediately before switching an operation method and at the same time for changing over a slip phase to a sine wave fixed to a slip frequency immediately before switching an operation method and for performing the control by an excitation current with a constant frequency.

2. The operation control method according to claim 1, wherein:

in the power fluctuation suppression circuit using the synchronous operation method, a dead band is provided; and when a difference between the calculated torque direction excitation current command target value and the torque direction excitation current command value is kept within a predetermined value, control of the torque direction excitation current command value is not performed.

3. The operation control method according to claim 1, wherein:

in the power fluctuation suppression circuit using the synchronous operation method, the torque direction excitation current command value fixed to a value immediately before switching is caused to follow the calculated torque direction excitation current command target value in a ramp shape.

4. An operation control apparatus for a variable speed generator-motor, comprising:

an excitation device that excites a secondary winding of a variable speed generator-motor whose primary winding is connected to a power system by a three-phase AC excitation current;

an effective power adjustment computing device that calculates a torque direction excitation current command value to make zero deviations between a command value of an input/output effective power and detection value of an effective power of the variable speed generator-motor;

a voltage adjustment computing device that calculates a magnetic flux direction excitation current command value to make zero deviations of a command value of an output voltage and detection value of an output voltage of the variable speed generator-motor;

an excitation current adjustment computing device that vector-synthesizes a torque direction excitation current command value output from the effective power adjustment computing device, a magnetic flux direction excitation current command value output from the voltage adjustment computing device, and a slip phase equivalent to a difference between a voltage phase of the power system and a rotation phase of the variable speed generator-motor, and calculates and outputs a three-phase AC excitation current command value to the excitation device;

a synchronous operation Iq switching control circuit that controls the switching, based on a command from a synchronous operation command circuit, of a variable speed operation method for controlling an excitation current by two components of a torque direction excitation current component and a magnetic flux direction excitation current component, and a synchronous operation method for changing over the torque direction excitation current command value to the effective power adjustment computing value immediately before switching an operation method and at the same time for changing over a slip phase to a sine wave fixed to a slip frequency immediately before switching an operation method and for performing the control by an excitation current having a constant frequency; and a power fluctuation suppression circuit that causes the torque direction excitation current command value to be fixed to a value immediately before switching to follow a torque direction excitation current command target value calculated from an effective power by a predetermined conversion circuit, filter circuit, and limiter circuit during operation control using the synchronous operation method.

5. The operation control apparatus according to claim 4, wherein:

in the power fluctuation suppression circuit using the synchronous operation method, a dead band is provided; and when a difference between the calculated torque direction excitation current command target value and the torque direction excitation current command value is kept within a previously set value, control of the torque direction excitation current command value is not performed.

6. The operation control apparatus according to claim 4, wherein:

in the power fluctuation suppression circuit using the synchronous operation method, the torque direction excitation current command value fixed to a value immediately before switching is caused to follow the calculated torque direction excitation current command target value in a ramp shape.

* * * * *